United States Patent
Choi et al.

(10) Patent No.: US 9,863,688 B2
(45) Date of Patent: Jan. 9, 2018

(54) REFRIGERATOR AND OPERATING METHOD THEREOF

(71) Applicant: LG ELECTRONICS INC., Seoul (KR)

(72) Inventors: Byoungsuk Choi, Seoul (KR); Jinseok Hu, Seoul (KR); Heesun Kim, Seoul (KR); Shinhyun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 185 days.

(21) Appl. No.: 14/831,658

(22) Filed: Aug. 20, 2015

(65) Prior Publication Data

US 2016/0054041 A1 Feb. 25, 2016

(30) Foreign Application Priority Data

Aug. 21, 2014 (KR) .................. 10-2014-0109100

(51) Int. Cl.
*F25D 17/06* (2006.01)
*F25D 11/00* (2006.01)
(Continued)

(52) U.S. Cl.
CPC .............. *F25D 17/065* (2013.01); *F25B 5/02* (2013.01); *F25D 11/006* (2013.01);
(Continued)

(58) Field of Classification Search
CPC ..... F25D 11/006; Y02B 40/32; Y02B 30/743; F25B 2600/0251; F25B 2700/2104;
(Continued)

(56) References Cited

U.S. PATENT DOCUMENTS 5,778,694 A * 7/1998 Jeong ................ F25D 17/045
236/51
6,181,538 B1 * 1/2001 Yoo ................ F25B 49/025
361/22

(Continued)

FOREIGN PATENT DOCUMENTS

JP H 05-071847 3/1993
JP 2013-117976 A 6/2013
(Continued)

OTHER PUBLICATIONS

Korean Notice of Allowance dated Jun. 8, 2016 issued in Application No. 10-2014-0125592.
(Continued)

*Primary Examiner* — Emmanuel Duke
(74) *Attorney, Agent, or Firm* — KED & Associates, LLP (57) ABSTRACT

A refrigerator includes a compressor, a cold storage medium, a power supply to convert AC power supplied from an outside of the refrigerator, and to receive DC power during interruption of electric power, and a controller to perform a control operation to supply a cooling capacity to an interior of the refrigerator by driving the compressor based on the supplied AC power when no interruption of electric power occurs, and to perform a control operation to supply a cooling capacity to the interior of the refrigerator based on the supplied DC power and the cold storage medium during the interruption of electric power. Accordingly, consumption of electric power during interruption of electric power is reduced.

17 Claims, 10 Drawing Sheets

(51) Int. Cl.
*F25B 5/02* (2006.01)
*F25D 29/00* (2006.01)

(52) U.S. Cl.
CPC ....... *F25B 2400/24* (2013.01); *F25B 2500/19* (2013.01); *F25B 2600/021* (2013.01); *F25B 2600/0251* (2013.01); *F25B 2600/112* (2013.01); *F25B 2700/15* (2013.01); *F25B 2700/2104* (2013.01); *F25D 29/00* (2013.01); *Y02B 30/741* (2013.01); *Y02B 30/743* (2013.01); *Y02B 40/32* (2013.01)

(58) Field of Classification Search
CPC ............ F25B 2600/112; F25B 2400/24; F25B 2500/19; F25B 2700/15
See application file for complete search history.

(56) References Cited

U.S. PATENT DOCUMENTS

| | | | |
|---|---|---|---|
| 2006/0260335 A1 | 11/2006 | Montuoro et al. | |
| 2009/0293523 A1* | 12/2009 | Bittner | F25B 25/005 62/236 |
| 2011/0067423 A1* | 3/2011 | Kawamukai | F25D 21/006 62/234 |
| 2011/0298302 A1 | 12/2011 | Pitigoi-Aron | |
| 2011/0302939 A1* | 12/2011 | Rockenfeller | H02P 1/30 62/89 |
| 2012/0112547 A1 | 5/2012 | Ghosh et al. | |
| 2012/0286723 A1 | 11/2012 | Ukita et al. | |
| 2012/0324260 A1 | 12/2012 | Kezuka et al. | |
| 2013/0229172 A1 | 9/2013 | Heo et al. | |
| 2013/0313902 A1 | 11/2013 | Sako et al. | |
| 2014/0013779 A1* | 1/2014 | Cho | F25D 11/02 62/56 |
| 2014/0316799 A1 | 10/2014 | Cosgrove et al. | |
| 2015/0214758 A1 | 7/2015 | Toya et al. | |
| 2015/0276821 A1 | 10/2015 | Hu et al. | |

FOREIGN PATENT DOCUMENTS

| | | |
|---|---|---|
| JP | 2013-247751 | 12/2013 |
| KR | 10-2000-0042551 | 7/2000 |
| KR | 10-2009-0012521 | 2/2009 |
| KR | 10-2009-0111708 A | 10/2009 |
| KR | 10-2010-0023604 A | 3/2010 |
| KR | 10-2012-0120095 | 11/2012 |
| KR | 10-2012-0129366 | 11/2012 |

OTHER PUBLICATIONS

Korean Office Action dated Aug. 18, 2016 issued in Application No. 10-2014-0110621.
Korean Office Action dated Oct. 24, 2016 issued in Application No. 10-2014-0109100.
Korean Office Action dated Mar. 6, 2017 issued in Application No. 10-2014-0109100.
Korean Office Action dated Mar. 3, 2016 issued in Application No. 10-2014-0125592.
U.S. Office Action dated Sep. 8, 2017 issued in co-pending U.S. Appl. No. 14/832,615.
United States Office Action dated Oct. 27, 2017 issued in U.S. Appl. No. 14/832,779.

* cited by examiner

REFRIGERATOR AND OPERATING METHOD THEREOF

CROSS-REFERENCE TO RELATED APPLICATION

This application claims priority under 35 U.S.C. §119 to Korean Patent Application No. 10-2014-0109100, filed on Aug. 21, 2014 in the Korean Intellectual Property Office, whose entire disclosure is hereby incorporated by reference.

BACKGROUND

1. Field

The present disclosure relates to a refrigerator and an operating method thereof, and more particularly to a refrigerator and an operating method thereof, which are capable of reducing consumption of electric power upon interruption of electric power.

2. Background

Generally, refrigerators are appliances used to store food in a fresh state for a lengthened period of time. Such a refrigerator includes a freezing compartment for storing food in a frozen state, a refrigerating compartment for storing food in a refrigerated state, and a refrigeration cycle for cooling the freezing compartment and refrigerating compartment. Operation of the refrigerator is controlled by a controller included in the refrigerator. A variety of research is being conducted to stably operate such a refrigerator even when supply of electric power is unstable, in particular, during interruption of electric power.

BRIEF DESCRIPTION OF THE DRAWINGS

The embodiments will be described in detail with reference to the following drawings in which like reference numerals refer to like elements wherein.

DETAILED DESCRIPTION

Refrigerators described in this specification may be a type of home appliance. Home appliances may include refrigerators, dryers, air conditioners, dehumidifiers, cooking appliances, cleaners, etc. The following description will be given in conjunction with refrigerators among various home appliances, but as can be appreciated, the present disclosure is applicable to other types of home appliances.

Figure 1:
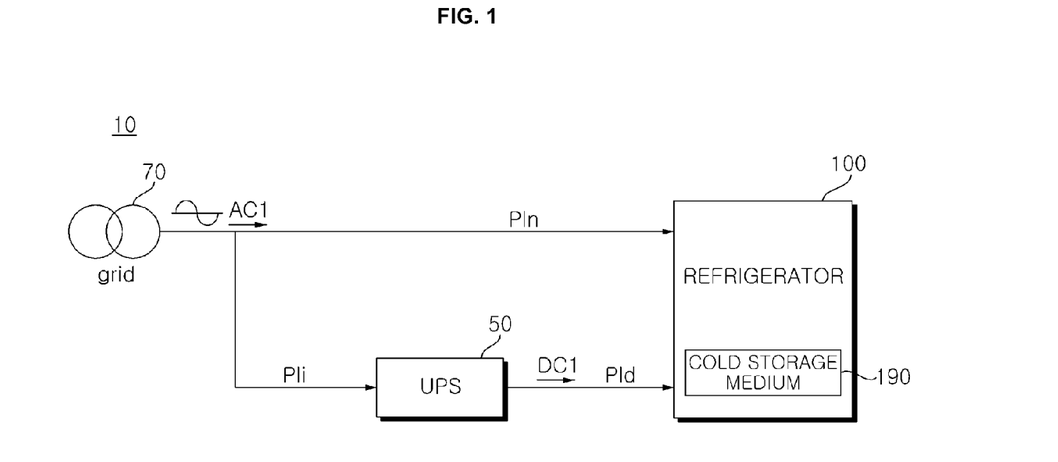
FIG. 1 is a view illustrating an example of supply of electric power to a refrigerator according to an embodiment of the present disclosure.

FIG. 1 illustrates an example of supply of electric power to a refrigerator according to an embodiment of the present disclosure. The refrigerator power supply system 10 may include a refrigerator 100, a grid 70, and an uninterruptible or back-up power supply (UPS) 50.

The grid 70 supplies commercial AC power AC1 to the refrigerator 100 via a first power line Pln. The UPS 50 may be connected to the first power line Pln in parallel in order to cope with a situation in which commercial AC power supplied from the grid 70 has an unstable level or supply of the commercial AC power is interrupted. In FIG. 1, parallel connection of a second power line Pli to the first power line Pln is illustrated.

The UPS 50 may determine interruption of electric power when AC power applied via the second power line Pli has a level equal to or lower than a predetermined level. In this case, the UPS 50 may supply DC power DC1 stored in an internal battery to the refrigerator 100 via a third power line Pld.

In a normal state other than interruption of electric power, the refrigerator 100 may receive the commercial AC power AC1 from the grid 70 via the first power line Pln. On the other hand, during interruption of electric power, the refrigerator 100 may receive the DC power DC1 from the UPS 50 via the third power line Pld.

Figure 2:
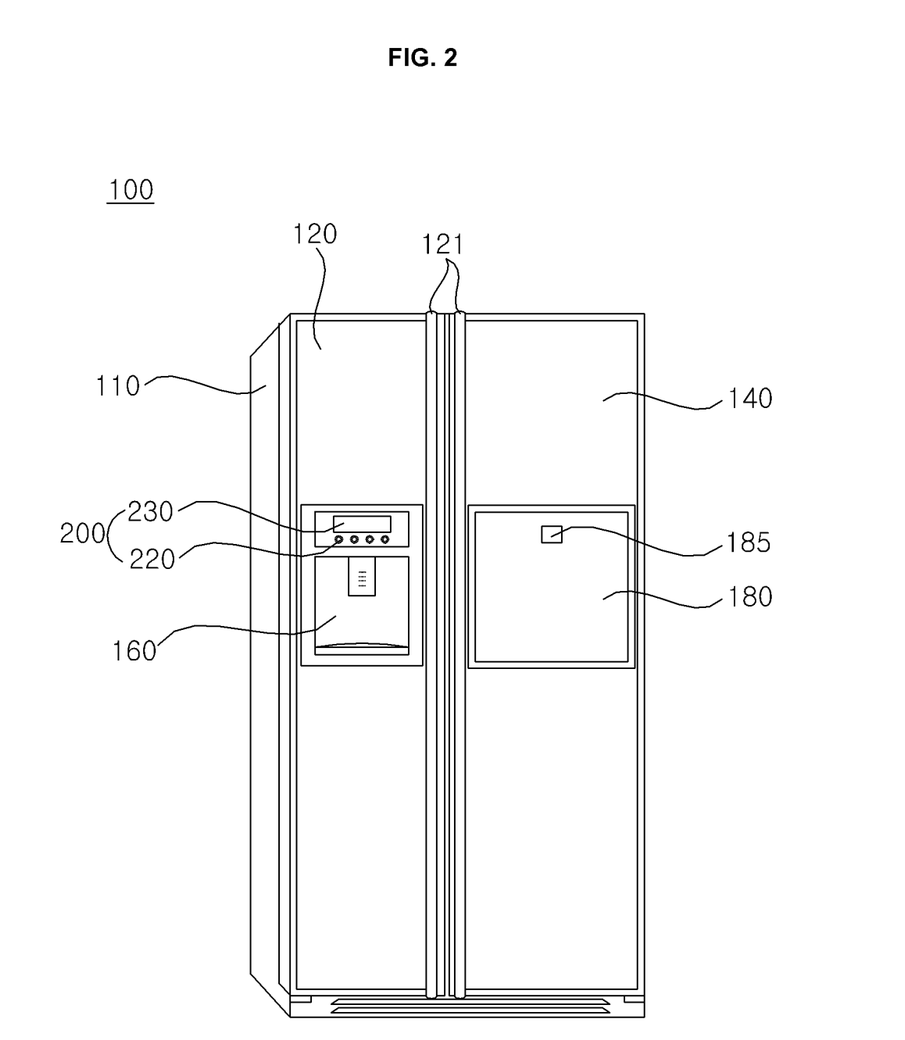
FIG. 2 is a perspective view illustrating a refrigerator concerned with the present disclosure.

FIG. 2 is a perspective view illustrating a refrigerator concerned with the present disclosure. In the refrigerator 100 concerned with the present disclosure, although not shown, the appearance of the refrigerator 100 is approximately defined by a case 110 having an inner space partitioned into a freezing compartment and a refrigerating compartment, a freezing compartment door 120 for closing the freezing compartment, and a refrigerating compartment door 140 for closing the refrigerating compartment.

Door handles 121 are provided at respective front surfaces of the freezing compartment door 120 and refrigerating compartment door 140. The door handles 121 protrude forwardly in order to allow the user to easily pivot the freezing compartment door 120 and refrigerating compartment door 140 while grasping the door handles 121. A home bar 180 may be further provided at the front surface of the refrigerating compartment door 140, as a convenience means for allowing the user to retrieve articles, such as beverages, stored inside of the refrigerating compartment door 140 without opening the refrigerating compartment door 140.

A dispenser 160 may also be provided at the front surface of the freezing compartment door 120, as a convenience means for allowing the user to retrieve ice or drinking water without opening the freezing compartment door 120. A control panel 200 may further be provided at the front surface of the freezing compartment door 120 above the dispenser 160. The control panel 200 allows the user to control operation of the refrigerator 100a, and displays a state of the refrigerator 100a on a screen. The control panel 200 may include an input unit 220 including a plurality of buttons, and a display 230 for displaying a control screen, an operation state, etc.

The display 230 displays information such as a control screen, operation state, and compartment temperature. For example, the display 230 may display a service type of the dispenser 160 (ice cubes, water, or crushed ice), a set freezing compartment temperature, and a set refrigerating compartment temperature. The display 230 may be implemented using various displays such as a liquid crystal display (LCD), a light emitting diode (LED), and an organic light emitting diode (OLED). Alternatively, the display 230 may be implemented using a touchscreen capable of additionally performing the function of the input unit 220.

The input unit 220 may include a plurality of operating buttons. For example, the input unit 220 may include a dispenser setting button for setting a service type of the dispenser (ice cubes, water, or crushed ice), a freezing compartment temperature setting button for setting a freezing compartment temperature, and a refrigerating compartment temperature setting button for setting a refrigerating compartment temperature. Meanwhile, the input unit 220 may be implemented using a touchscreen capable of additionally performing the function of the display 230.

The refrigerator associated with the present disclosure is not limited to the double door type illustrated in the drawings, and may be of any type, for example, one door type, sliding door type, or curtain door type, so long as a compressor and a fan are provided for the refrigerating cycle or freezing cycle of the refrigerator.

Figure 3:
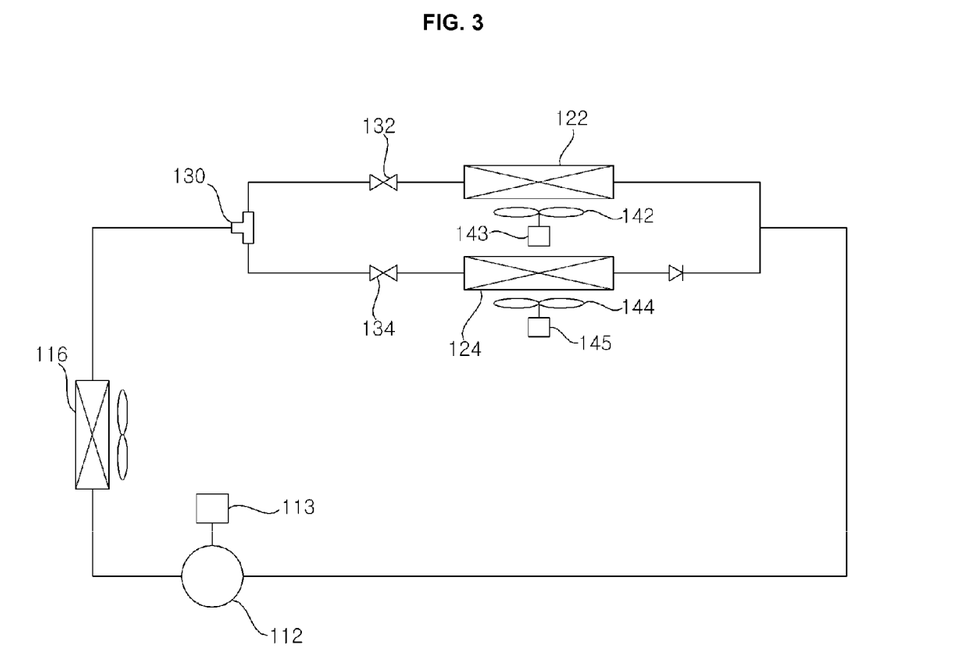
FIG. 3 is a view roughly illustrating a configuration of the refrigerator illustrated in FIG. 2.

FIG. 3 is a view roughly illustrating a configuration of the refrigerator illustrated in FIG. 2. The refrigerator 100 includes, in addition to the compressor 112, a condenser 116 for condensing a refrigerant compressed in the compressor 112, a refrigerating compartment evaporator 122, and a freezing compartment evaporator 124. The refrigerating compartment evaporator 122 and freezing compartment evaporator 124 are disposed in the refrigerating compartment and the freezing compartment, respectively, to evaporate the refrigerant condensed in the condenser 116 after receiving the condensed refrigerant.

The refrigerator 100 further includes a 3-way valve 130 for supplying the condensed refrigerant from the condenser 116 to the refrigerating compartment evaporator 122 or the freezing compartment evaporator 124, a refrigerating compartment expansion valve 132 for expanding the refrigerant supplied to the refrigerating compartment evaporator 122, and a freezing compartment expansion valve 134 for expanding the refrigerant supplied to the freezing compartment evaporator 124. The refrigerator 100 may further include a gas-liquid separator for separating the refrigerant emerging from the evaporators 122 and 124 into a gaseous refrigerant and a liquid refrigerant.

The refrigerator 100 may additionally include a refrigerating compartment fan 142 for sucking cold air emerging from the refrigerating compartment evaporator 122, and blowing the sucked cold air into the refrigerating compartment, and a freezing compartment fan 144 for sucking cold air emerging from the freezing compartment evaporator 124, and blowing the sucked cold air into the freezing compartment.

The refrigerator 100 may further include a compressor driver 113 for driving the compressor 112, a refrigerating compartment fan driver 143 for driving the refrigerating compartment fan 142, and a freezing compartment fan driver 145 for driving the freezing compartment fan 144.

Figure 4:
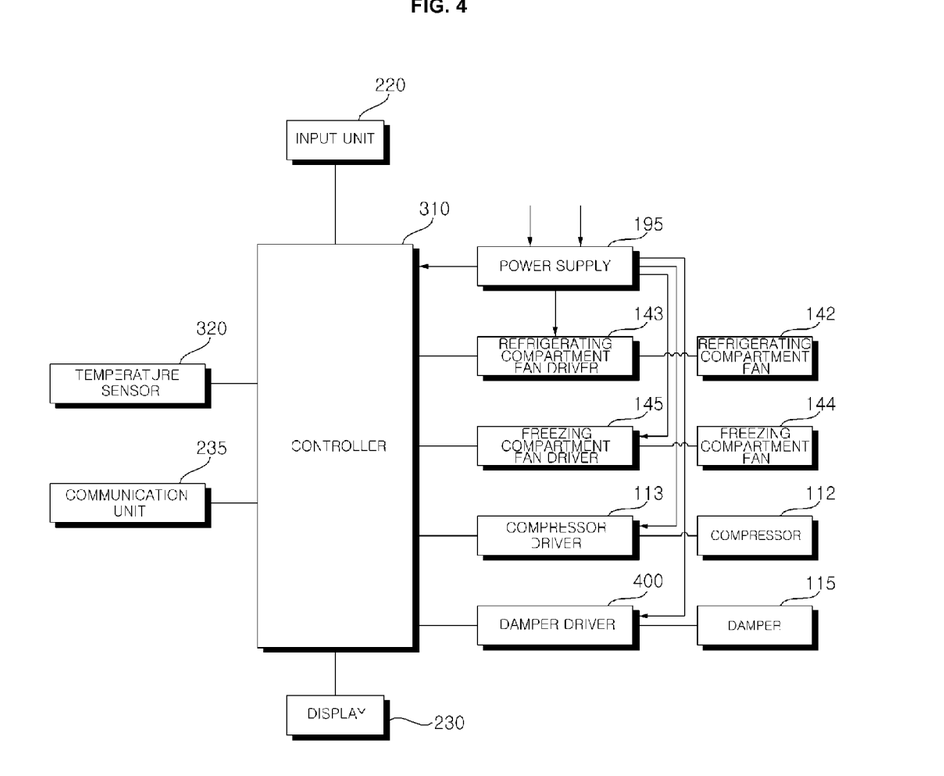
FIG. 4 is a block diagram roughly illustrating an inner configuration of the refrigerator illustrated in FIG. 2.

FIG. 4 is a block diagram roughly illustrating an inner configuration of the refrigerator illustrated in FIG. 2. In accordance with an embodiment of the present disclosure, the refrigerator 100 may include a compressor 112, a cold storage medium 190, a power supply 195 for converting the AC power AC1, which is supplied from the outside of the refrigerator 100, while receiving the DC voltage DC1 from the UPS 50 during interruption of electric power. The refrigerator 100 further includes a controller 310 for performing a control operation to supply cooling capacity to the interior of the refrigerator 100 by driving the compressor 112 based on the supplied commercial AC power AC1 when no interruption of electric power occurs, and to perform a control operation to supply cooling capacity to the interior of the refrigerator 100 based on the supplied DC power DC1 and the cold storage medium 190.

In particular, during interruption of electric power, the refrigerator 100 supplies a cooling capacity based on the cold storage medium 190 to the interior of the refrigerator 100 for a first period, and then drives the compressor 112 based on the supplied DC power DC1 for a second period, to supply a cooling capacity based on the compressor 112 to the interior of the refrigerator 100. Accordingly, it may be possible to reduce consumption of the DC power DC1 from the UPS 50 during interruption of electric power by supplying a cooling capacity to the interior of the refrigerator 100 during interruption of electric power, using the cold storage medium and the supplied DC power DC1. As a result, it may be possible to stably supply a cooling capacity to the interior of the refrigerator 100 even when interruption of electric power is lengthened.

Meanwhile, the cold storage medium 190 may be disposed in the freezing compartment. Such an operation method of the refrigerator will be described later in more detail with reference to FIG. 6.

The refrigerator 100 further includes a damper 115, and a temperature sensor 320, in addition to the compressor 112, refrigerating compartment fan 142, freezing compartment fan 144. The refrigerator 100 may further include a communication unit 235 and a damper driver 400, in addition to the compressor driver 113, refrigerating fan driver 143, freezing compartment fan driver 145, and input unit 220. Description of the compressor 112, refrigerating compartment fan 142, and freezing compartment fan 144 may refer to the description given with reference to FIG. 3.

The input unit 220 includes a plurality of operating buttons and, as such, sends an input signal, for example, a freezing compartment setting temperature or a refrigerating compartment setting temperature, to the controller 310.

The temperature sensor 320 senses internal temperature of the refrigerator 100, and a signal representing the sensed temperature to the controller 310. The temperature sensor 320 may sense a refrigerating compartment temperature and a freezing compartment temperature. The temperature sensor 320 may also sense temperature of each chamber in the refrigerating compartment or temperature of each chamber in the freezing compartment.

The damper 115 may be disposed between the refrigerating compartment and the freezing compartment. The damper driver 400 may drive the damper 115 to be opened. For example, when the cold storage medium 190 is disposed in the freezing compartment, the damper 115 may be opened to supply the cooling capacity of the freezing compartment to the refrigerating compartment.

Upon interruption of electric power, the damper driver 400 may drive the damper 115 to be opened in order to allow cold air generated by the cold storage medium 190 disposed in the freezing compartment to be supplied to the refrigerating compartment. Opening time or opening degree of the damper 115 may be varied in accordance with temperature of the freezing compartment or temperature of the refrigerating compartment. Opening time or opening degree of the damper 115 may be varied in accordance with temperature of the refrigerating compartment.

The power supply 195 may receive the commercial AC power AC1 from the outside in a normal state. On the other hand, during interruption of electric power, the power supply 195 may receive the DC power DC1 from the UPS 50.

The power supply 195 may include a first converter 410 (FIG. 5) for converting the commercial AC power AC1 supplied from the outside into DC power, and an inverter 420 for converting the converted DC power into AC power. The AC power converted by the inverter 420 may be supplied to the refrigerating compartment fan 142, freezing compartment fan 144, and compressor 112, to be used for driving thereof.

The power supply 195 may further include a second converter 415 (FIG. 5) for converting level of the DC power DC1 supplied from the external UPS 50 during interruption of electric power. The DC power level-converted by the second converter 415 may be applied to the damper 115. The DC power level-converted by the second converter 415 may also be applied to the inverter 420 to be used for driving of the refrigerating compartment fan 142, freezing compartment fan 144, and compressor 112. In addition, the power supply 195 may supply the converted DC power or the converted AC power to the compressor driver 113, fan drivers 143 and 145, damper driver 400, etc.

The display 230 may display an operation state of the refrigerator 100 or the like. The display 230 may include an LED, an LCD, or an OLED. The display 230 may display a cooling capacity supply mode upon interruption of electric power. For example, when the cooling capacity supply mode upon interruption of electric power is a mode based on the DC power and cold storage medium, the display 230 may display information representing this mode. On the other hand, when the cooling capacity supply mode upon interruption of electric power is a mode based on the cold storage medium, the display 230 may display information representing this operation mode.

The communication unit 235 may exchange data with an external device through wired or wireless communication. For example, the communication unit 235 may receive information about interruption of electric power, kind and level of backup power supplied upon interruption of electric power, supply duration of the backup power, etc. from an access point (AP) device, the UPS 50, or a mobile terminal by a power line communication (PLC) system, a wireless fidelity (Wi-Fi) system, a ZigBee system, or the like.

The controller 310 may control various operations of inner constituent elements of the refrigerator 100. For example, the controller 310 may control the compressor driver 113, fan drivers 143 and 145, and damper driver 400 in order to control operations of the compressor 112, fans 142 and 144, damper 115, etc.

In accordance with an embodiment of the present disclosure, the controller 310 may perform a control operation to drive the compressor 112, based on the supplied AC power AC1 when no interruption of electric power occurs, in order to supply cooling capacity to the interior of the refrigerator 100, and may perform a control operation to supply cooling capacity to the interior of the refrigerator 100 based on the supplied DC power DC1 and the cold storage medium 190 during interruption of electric power.

During interruption of electric power, the controller 310 may perform a control operation to supply a cooling capacity based on the cold storage medium 190 to the interior of the refrigerator 100 for the first period, and may perform a control operation to drive the compressor 112 based on the supplied DC power DC1 for the second period in order to supply a cooling capacity based on the compressor 112 to the interior of the refrigerator 100.

In addition, during interruption of electric power, the controller 310 may perform a control operation to open the damper 115 for at least the first period in order to supply cold air generated by the cold storage medium 190 disposed in the freezing compartment. In this case, the controller 310 may vary at least one of the opening time and opening degree of the damper 115 based on temperature of the refrigerating compartment.

When temperature of the refrigerating compartment is equal to or lower than a reference temperature, upon interruption of electric power, the controller 310 may perform a control operation to turn off the compressor 112. On the other hand, when temperature of the refrigerating compartment is higher than the reference temperature, upon interruption of electric power, the controller 310 may perform a control operation to drive the compressor 112.

The controller 310 may also perform a control operation to vary operation mode or operation time of the refrigerator 100 upon interruption of electric power based on information about interruption of electric power, kind and level of backup power supplied upon interruption of electric power, supply duration of the backup power, etc. The controller 310 may perform a control operation to achieve a customized operation.

Figure 5:
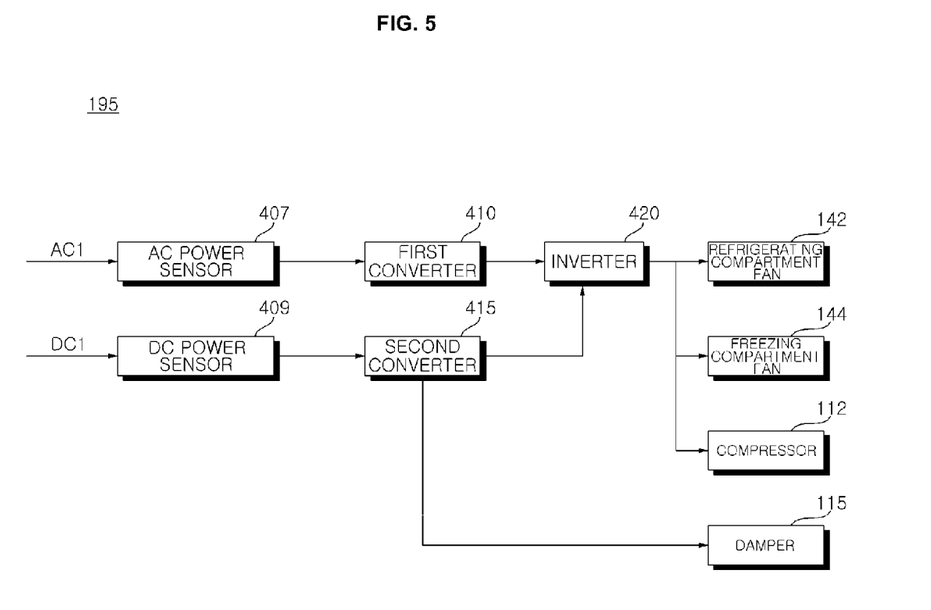
FIG. 5 is a block diagram illustrating an example of an inner configuration of a power supply illustrated in FIG. 4.

FIG. 5 is a block diagram illustrating an example of the inner configuration of the power supply illustrated in FIG. 4. The power supply 195 may include an AC power sensor 407 for sensing the commercial AC power AC1 supplied from the outside in a normal state, the first converter 410 for converting the commercial AC power AC1 supplied from the outside into DC power, and the inverter 420 for converting the converted DC power into AC power. The AC power converted by the inverter 420 may be supplied to the refrigerating compartment fan 142, freezing compartment fan 144, and compressor 112, to be used for driving thereof.

The power supply 195 may further include a DC power sensor 409 for sensing the DC power DC1 supplied from the external UPS 50 upon interruption of electric power, and the second converter 415 for converting level of the DC power DC1 supplied from the external UPS 50 upon interruption of electric power. The DC power level-converted by the second converter 415 may be applied to the damper 115. The DC power level-converted by the second converter 415 may also be applied to the inverter 420 to be used for driving of the refrigerating compartment fan 142, freezing compartment fan 144, and compressor 112. The power supply 195 may further supply the converted DC power or converted AC power to the compressor driver 113, fan drivers 143 and 145, damper driver 400, etc.

The AC power sensor 407 may detect the commercial AC power AC1 input from the grid 70. The AC power sensor 407 may include a current transformer (CT) to detect an input AC current, a shunt resistor, a voltage transformer (VT) to detect an input AC voltage, etc. The detected input AC current or input AC voltage may be input to the controller 310, as a discrete pulse signal. The controller 310 may determine whether or not interruption of the commercial AC power AC1 has occurred based on the detected input AC current or input AC voltage.

The DC power sensor 409 may detect the DC power DC1 input from the UPS 50. The DC power sensor 409 may include a current transformer (CT) to detect an input DC current, a shunt resistor, a voltage transformer (VT) to detect an input DC voltage, etc. The detected input DC current or input DC voltage may be input to the controller 310, as a discrete pulse signal. The controller 310 may determine whether or not interruption of the commercial AC power AC1 has occurred, based on the detected input DC current or input DC voltage.

The first converter 410 converts the commercial AC power AC1 into DC power, and then outputs the converted DC power. For example, the first converter 410 may be constituted by a diode, etc. without using a switching element and, as such, may perform a rectification operation without requiring a separate switching operation. Alternatively, the first converter 410 may include a switching element. In this case, the first converter 410 may perform boosting operation, improvement of power factor, and DC power conversion through switching operation of the switching element.

The second converter 415 may convert level of the DC power DC1, and may output the level-converted DC power DC1. The second converter 415 may be a DC/DC converter. For example, the second converter 415 may be a buck converter, a boost converter, a buck-boost converter, or a fly-back converter.

The inverter 420 includes a plurality of inverter switching elements. In accordance with ON/OFF operations of the inverter switching elements, the inverter 420 may convert DC power received from the first converter 410 or second converter 415 into 3-phase AC power va-vb-vc having a predetermined frequency, and may output the 3-phase AC power va-vb-vc.

The inverter 420 may have a configuration in which three pairs of arm switching elements are connected in parallel, and each arm switching element pair includes upper and lower arm switching elements connected in series. In accordance with operations of the switching elements in the inverter 420, the converted AC power may be supplied to the refrigerating compartment fan 142, freezing compartment fan 144, compressor 112, etc.

Figure 6:
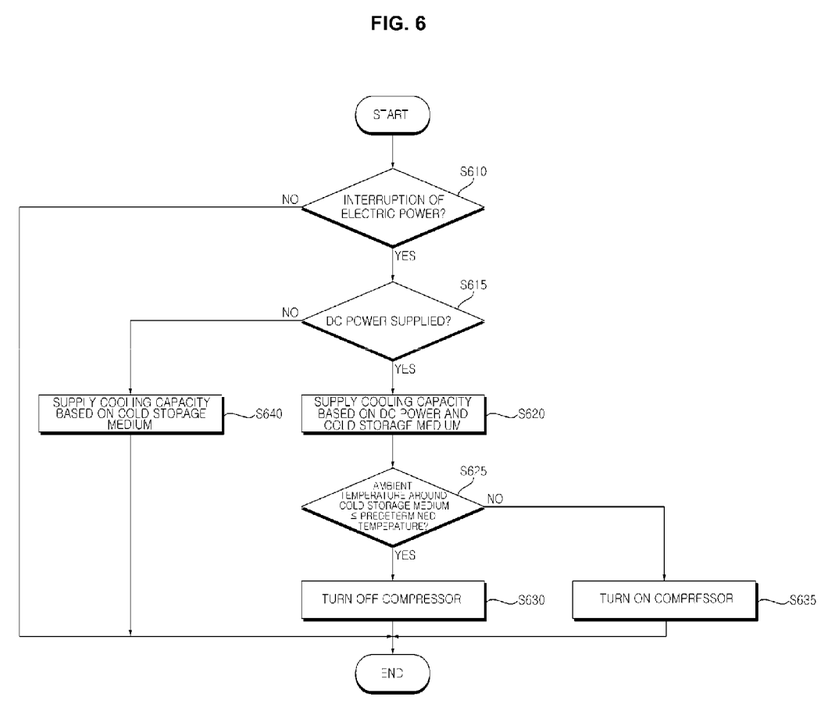
FIG. 6 is a flowchart illustrating an operating method of the refrigerator according to an embodiment of the present disclosure.
Figure 7:
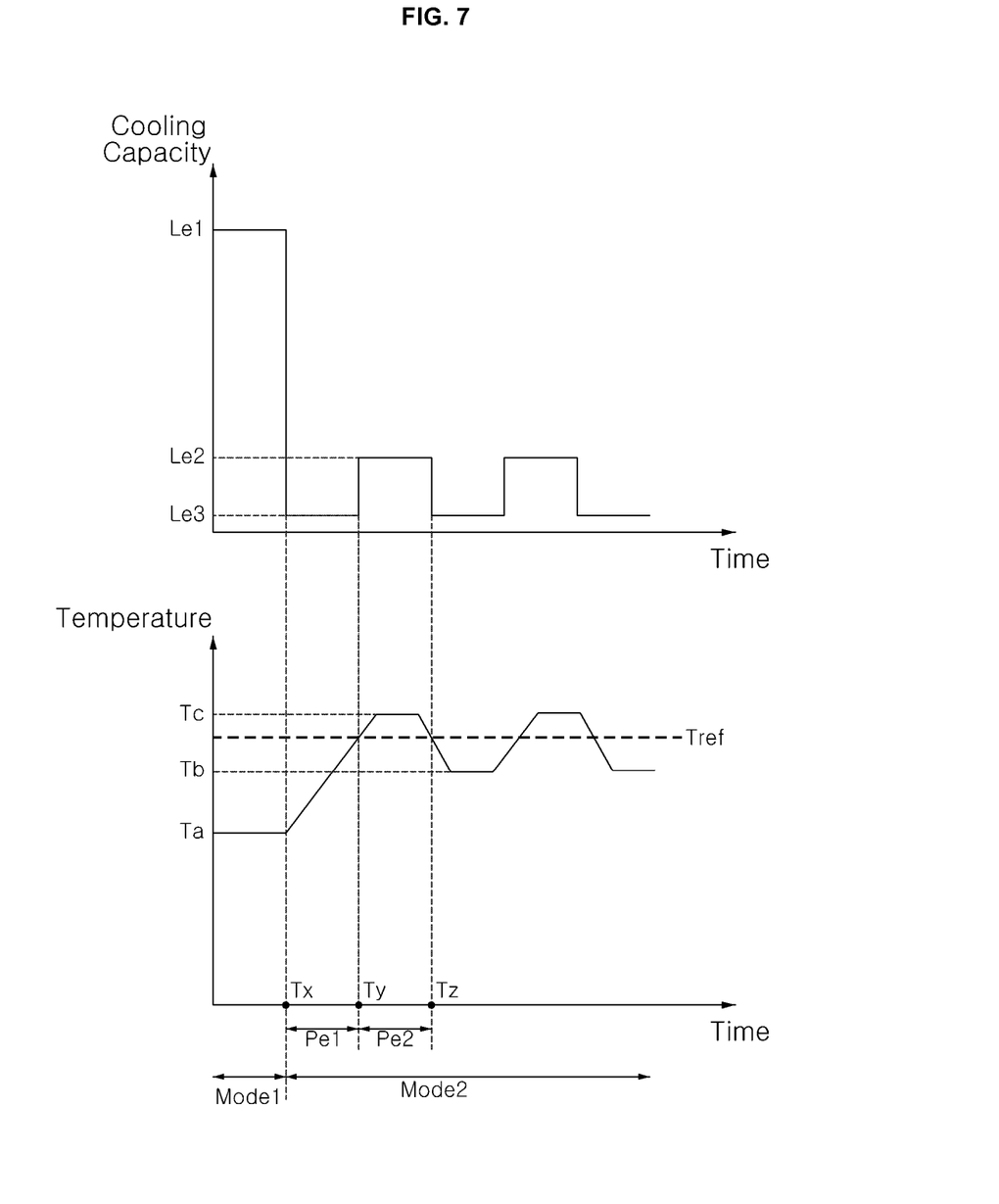
FIGS. 7 and 8 are views explaining the operating method of FIG. 6.
Figure 8:
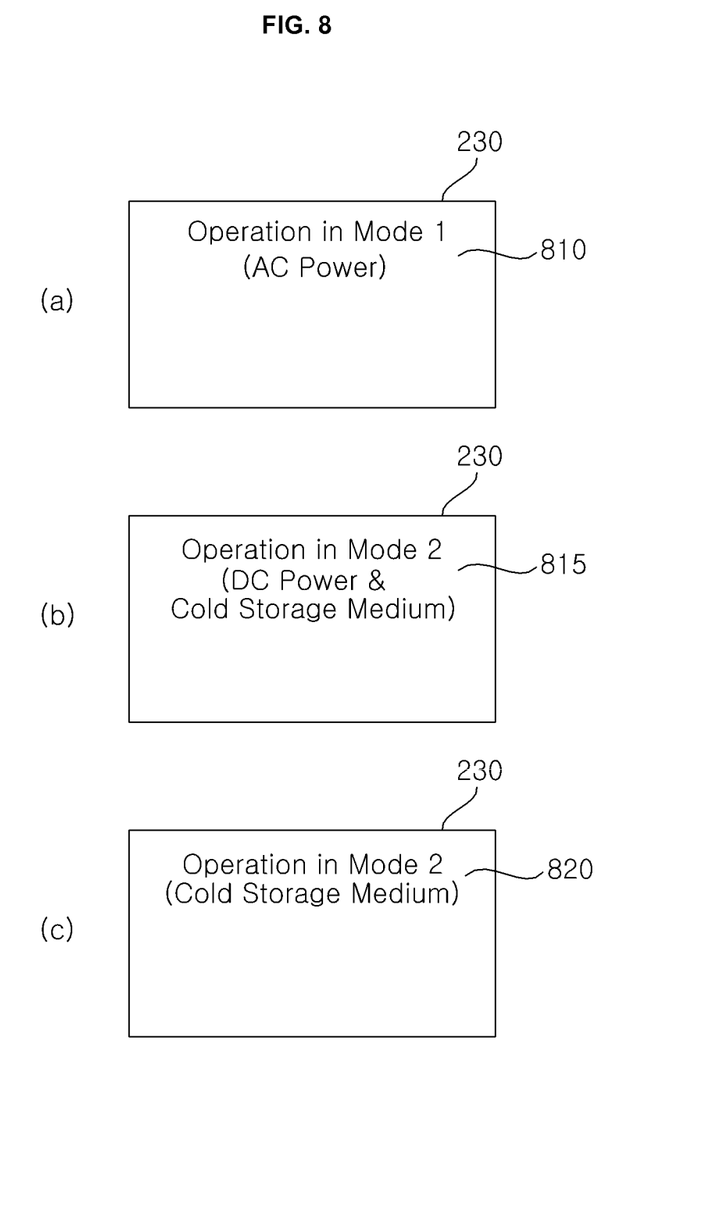

FIG. 6 is a flowchart illustrating an operating method of the refrigerator according to an embodiment of the present disclosure. FIGS. 7 and 8 are views explaining the operating method of FIG. 6.

The controller 310 first determines whether or not interruption of electric power has occurred (S610). For example, the controller 310 may determine whether or not interruption of electric power has occurred, based on level of the AC power AC1 sensed by the AC power sensor 407 or level of the DC power DC1 sensed by the DC power sensor 409.

When the level of the AC power AC1 sensed by the AC power sensor 407 is equal to or lower than a predetermined first level, the controller 310 may determine that interruption of electric power has occurred. Alternatively, when the level of the DC power DC1 sensed by the DC power sensor 409 is equal to or lower than a predetermined second level, the controller 310 may determine that interruption of electric power has occurred.

When it is not determined that interruption of electric power has occurred, the controller 310 controls the refrigerator 100 to operate normally. The controller 310 of the refrigerator 100 drives the compressor 112 based on the commercial AC power AC1 supplied to the refrigerator 100. On the other hand, when it is determined that interruption of electric power has occurred, step S615 is executed.

That is, the controller 310 of the refrigerator 100 determines whether or not the DC power DC1 is supplied (S615). For example, the controller 310 may not only determine that interruption of electric power has occurred, but may also determine that the DC power DC1 is supplied when the level of the DC power DC1 sensed by the DC power sensor 409 is equal to or higher than the predetermined second level.

When the DC power DC1 is supplied, the controller 310 of the refrigerator 100 performs a control operation to supply cooling capacity to the interior of the refrigerator 100 based on the supplied DC power DC1 and the cold storage medium 190 (S620).

During interruption of electric power, the controller 310 of the refrigerator 100 may perform a control operation to supply a cooling capacity based on the cold storage medium 190 to the interior of the refrigerator 100 for the first period, and may then perform a control operation to drive the compressor 112 based on the supplied DC power DC1 for the second period in order to supply a cooling capacity based on the compressor 112 to the interior of the refrigerator 100.

It may possible to reduce consumption of the DC power DC1 by additionally supplying cooling capacity using the cold storage medium in the refrigerator 100 during interruption of electric power as compared to the case in which only the DC power DC1 is supplied during interruption of electric power. Accordingly, it may be possible to supply cooling capacity to the interior of the refrigerator 100 for a lengthened period of time during interruption of electric power.

The controller 310 of the refrigerator 100 also determines whether or not ambient temperature around the cold storage medium 190 is equal to or lower than a predetermined temperature (S625). When it is determined that ambient temperature around the cold storage medium 190 is equal to or lower than the predetermined temperature, the controller 310 performs a control operation to turn off the compressor 112 (S630). On the other hand, when it is determined that ambient temperature around the cold storage medium 190 is higher than the predetermined temperature, the controller 310 performs a control operation to turn on the compressor 112, for driving thereof (S635).

For example, when the cold storage medium 190 is disposed in the freezing compartment, the controller 310 of the refrigerator 100 determines whether or not the refrigerating compartment temperature sensed by the temperature sensor 320 is equal to or lower than a predetermined temperature. When it is determined that the refrigerating compartment temperature is equal to or lower than the predetermined temperature, the controller 310 performs a control operation to turn off the compressor 112. On the other hand, when it is determined that the refrigerating compartment temperature is higher than the predetermined temperature, the controller 310 performs a control operation to turn on the compressor 112 for driving thereof.

Thus, it may be possible to supply cooling capacity such that temperature of the refrigerating compartment is prevented from rising continuously by selectively driving the compressor 112. On the other hand, when no DC power is supplied at step S615, the controller 310 of the refrigerator 100 performs a control operation to supply cooling capacity based on the cold storage medium 190 disposed in the refrigerator 100 (S640).

FIG. 7 illustrates an example of the operating method of the refrigerator before and after interruption of electric power. The time Tx represents a time when interruption of electric power occurs. The period before the time Tx is a period in which a first mode, i.e., a normal operation mode, is executed. On the other hand, the period after the time Tx is a period in which a second mode, i.e., an operation mode upon interruption of electric power, is executed. When the refrigerator 100 operates in the first mode, the compressor 112 is driven by the commercial AC power AC1 and, a first cooling capacity Le1 based on the compressor 112 may be supplied to the interior of the refrigerator 100.

Meanwhile, when interruption of electric power occurs at the time Tx, operation of the compressor 112 is temporarily stopped and, as such, a cooling capacity Le3 based on the cold storage medium 190 disposed in the freezing compartment may be supplied to the interior of the refrigerator 100.

At the time Tx, the commercial AC power AC1 is not supplied to the refrigerator 100 and the DC power DC1 from the UPS 50 may be supplied to the refrigerator. When the refrigerator 100 operates in the second mode, the cooling capacity Le3 based on the cold storage medium 190 may be supplied to the interior of the refrigerator 100 for a first period Pe1. Subsequently, a cooling capacity Le2 generated by the compressor 112 based on the supplied DC power DC1 may be supplied to the interior of the refrigerator 100 for a second period Pe2.

The cooling capacity Le3 or Le2 supplied to the interior of the refrigerator 100 during interruption of electric power, i.e., in the second mode, is lower than the cooling capacity Le1 supplied to the interior of the refrigerator 100 when no interruption of electric power occurs, i.e., in the first mode. In addition, the cooling capacity Le3 supplied to the interior of the refrigerator 100 for the first period may be lower than the cooling capacity Le2 supplied to the interior of the refrigerator 100 for the second period.

The internal temperature of the refrigerator 100 during operation in the first mode may be, for example, a first temperature Ta. The internal temperature of the refrigerator 100 during operation in the second mode in accordance with interruption of electric power may rise continuously, as illustrated in FIG. 7.

The controller 310 performs a control operation to turn off the compressor 112 when temperature of the refrigerating compartment is equal to lower than a reference temperature during interruption of electric power. On the other hand, the controller 310 performs a control operation to turn on the compressor 112 when temperature of the refrigerating compartment is higher than the reference temperature during interruption of electric power.

For example, in the case of FIG. 7, during interruption of electric power, the controller 310 performs a control operation to only supply the cooling capacity Le3 based on the cold storage medium 190 in an OFF state of the compressor 112 for the first period Pe1 in which temperature of the refrigerating compartment is equal to or lower than a reference temperature Tref. The controller 310 performs a control operation to open the damper 115 for the first period Pe1 in order to supply cold air generated by the cold storage medium 190 to the refrigerating compartment.

For a period from the time Ty, at which temperature of the refrigerating compartment is higher than the reference temperature Tref, to a time Tz, namely, the second period Pe2, the controller 310 performs a control operation to turn on the compressor 112 in order to supply the cooling capacity Le2 generated by the compressor 112 to the interior of the refrigerator 100.

On the other hand, for the second period Pe2, the controller 310 may perform a control operation to close the damper 115 in order to prevent cold air generated by the cold storage medium 190 disposed in the freezing compartment from being supplied to the refrigerating compartment. Alternatively, for the second period Pe2, it may be possible to supply both the cooling capacity Le2 generated by the compressor 112 and the cooling capacity Le3 generated by the cold storage medium 190 to the interior of the refrigerator 100.

FIG. 7 illustrates repetition of the first and second periods Pe1 and Pe2 according to whether or not temperature of the refrigerating compartment is higher than the reference temperature Tref. Thus, consumption of the DC power DC1 may be reduced in accordance with use of both the cooling capacity based on the supplied DC power DC1 and the cooling capacity based on the cold storage medium during interruption of electric power. It may also be possible to stably supply cooling capacity for a lengthened period of time. Accordingly, implementation of an ever-cool mode may be achieved during interruption of electric power.

Meanwhile, cooling capacity means electric power or power level needed to cool the interior of the refrigerator.

Specifically, cooling capacity in FIG. 7 may correspond to power consumption in the refrigerator. Thus, the cooling capacity Le1, Le2 and Le3 may correspond to electric power Le1, Le2 and Le3.

The display 230 may display a cooling capacity supply mode upon interruption of electric power. The display 230 may also individually display the first period and the second period. FIG. 8 illustrates display of operation mode information of the refrigerator on the display 230.

FIG. 8(a) illustrates that the display 230 displays information 810 representing a state in which cooling capacity is supplied to the interior of the refrigerator 100 by the commercial AC power AC1 in a normal mode, i.e., the first mode, when no interruption of electric power occurs.

FIG. 8(b) illustrates that the display 230 displays information 815 representing a state in which cooling capacity is supplied to the interior of the refrigerator 100 by the DC power and the cold storage medium during interruption of electric power, i.e., in the second mode.

Meanwhile, it may be possible to drive only the compressor 112 in the second period Pe2 of the second mode. It may be possible to supply cooling capacity to the interior of the refrigerator 100 by the compressor 112, differently than the illustrated case.

FIG. 8(c) illustrates that the display 230 displays information 820 representing a state in which cooling capacity is supplied to the interior of the refrigerator 100 by the cold storage medium during interruption of electric power, namely, in the second mode. In particular, FIG. 8(c) illustrates that cooling capacity is supplied by the cold storage medium in the first period Pe1 of the second mode.

Figure 9:
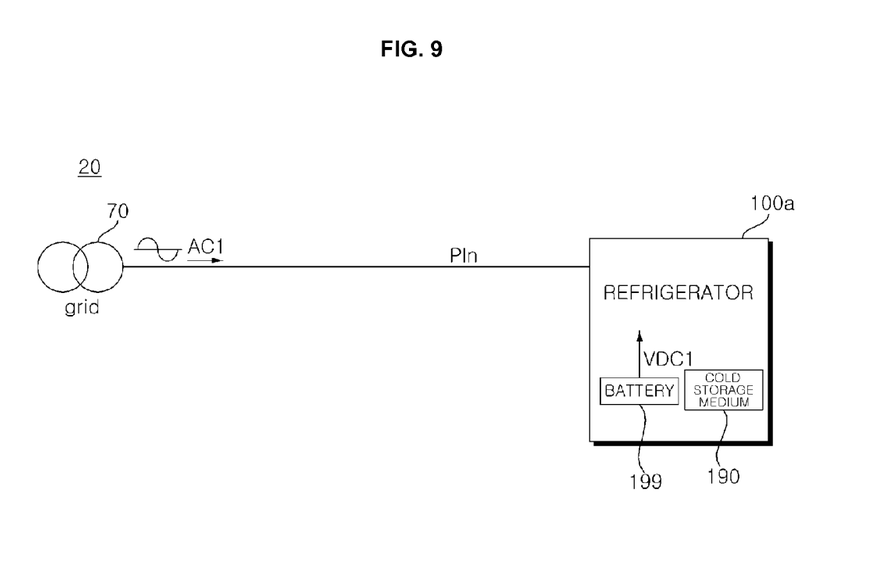
FIG. 9 is a view illustrating supply of electric power to a refrigerator according to another embodiment of the present disclosure.

FIG. 9 illustrates supply of electric power to a refrigerator according to another embodiment of the present disclosure. A power supply system 20 is illustrated. The power supply system 20 may include a refrigerator 100a and a grid 70. The case of FIG. 9 differs from the case of FIG. 1 in that the UPS 50 is omitted, and the refrigerator 100a further includes a battery 199. The refrigerator 100a of FIG. 9 may not include the DC power sensor 409 of FIG. 5. The following description will be given mainly in conjunction with the differences.

When no interruption of electric power occurs, the commercial AC power AC1 from the grid 70 is supplied to the refrigerator 100a via a first line Pln. Using the commercial AC power AC1, the refrigerator 100a supplies a cooling capacity generated by the compressor 112 using the commercial AC power AC1. The refrigerator 100a may store the DC power DC1 in the battery 199, using the commercial AC power AC1.

The refrigerator 100a may sense whether interruption of electric power has occurred based on the AC power AC1 sensed by the AC power sensor 407, and may supply cooling capacity to the interior of the refrigerator 100a based on the DC power DC1 stored in the battery 199 and the cold storage medium 190 upon interruption of electric power.

Figure 10:
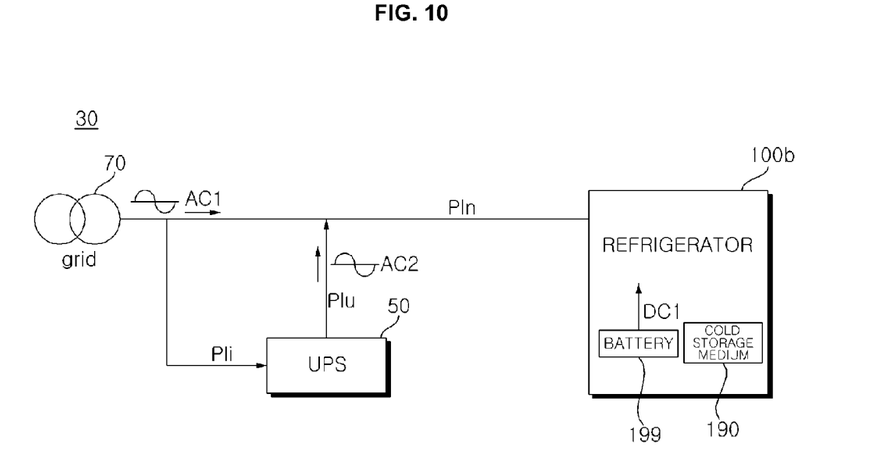
FIG. 10 a view illustrating supply of electric power to a refrigerator according to another embodiment of the present disclosure.

FIG. 10 illustrates supply of electric power to a refrigerator according to another embodiment of the present disclosure. A power supply system 30 is illustrated. The power supply system 30 may include a refrigerator 100b, a grid 70, and a UPS 50. The UPS 50 differs from that of FIG. 1 in that the UPS 50 does not supply the DC power DC1, but supplies second AC power AC2, and the refrigerator 100b further includes a battery 199. The refrigerator 100b of FIG. 10 may not include the DC power sensor 409 of FIG. 5. The following description will be given mainly in conjunction with such differences.

When no interruption of electric power occurs, the commercial AC power AC1 from the grid 70 is applied to the refrigerator 100b via a first line Pln. Using the commercial AC power AC1, the refrigerator 100b supplies a cooling capacity generated by the compressor 112 using the commercial AC power AC1. The refrigerator 100b may store the DC power DC1 in the battery 199 using the commercial AC power AC1.

During interruption of electric power, the UPS 50 supplies the second AC power AC2 to the first power line Pln via a line PLu. The refrigerator 100b may store the DC power DC1 to the battery 199 during interruption of electric power using the second AC power AC2. The refrigerator 100b may also supply cooling capacity to the interior of the refrigerator 100b based on the DC power DC1 stored in the battery 199 and the cold storage medium 190 upon interruption of electric power.

Figure 11:
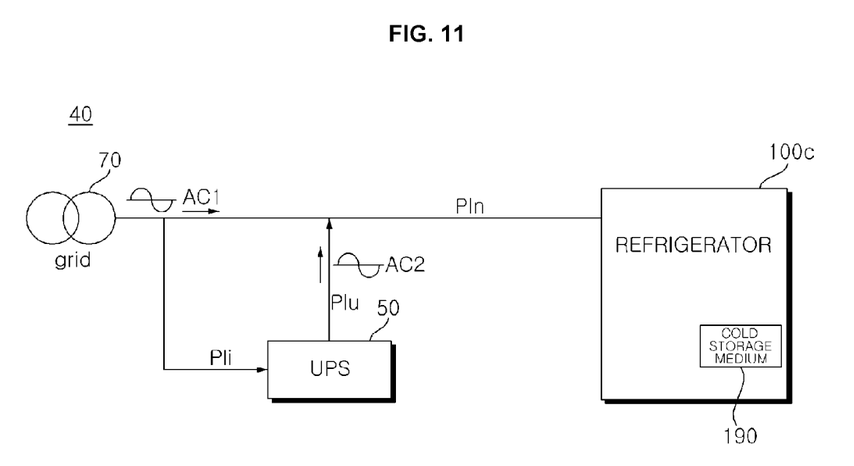
FIG. 11 a view illustrating supply of electric power to a refrigerator according to another embodiment of the present disclosure.

FIG. 11 illustrates supply of electric power to a refrigerator according to another embodiment of the present disclosure. A power supply system 40 is illustrated. The power supply system 40 may include a refrigerator 100c, a grid 70, and a UPS 50. The UPS 50 differs from that of FIG. 1 in that the UPS 50 does not supply the DC power DC1, but supplies second AC power AC2. The refrigerator 100c of FIG. 11 may not include the DC power sensor 409 and second converter 415 of FIG. 5. In this case, the damper 115 may be driven based on the DC power from the first converter 410, etc. The following description will be given mainly in conjunction with such differences.

When no interruption of electric power occurs, the commercial AC power AC1 from the grid 70 is applied to the refrigerator 100c via a first line Pln. Using the commercial AC power AC1, the refrigerator 100c supplies a cooling capacity generated by the compressor 112 using the commercial AC power AC1.

During interruption of electric power, the UPS 50 supplies the second AC power AC2 to the first power line Pln via a line PLu. The refrigerator 100c may also supply cooling capacity to the interior of the refrigerator 100c based on the second AC power AC2 and the cold storage medium 190 upon interruption of electric power.

In this case, during interruption of electric power, the controller 310 may perform a control operation to supply a cooling capacity based on the cold storage medium 190 to the interior of the refrigerator 100c for a first period Pe1, and may then perform a control operation to drive the compressor 112 based on the supplied second AC power AC2 for a second period Pe2 in order to supply a cooling capacity based on the compressor 112 to the interior of the refrigerator 100c. The controller 310 may also perform a control operation to open the damper 115 for at least the first period Pe1 in order to supply cold air generated by the cold storage medium 190 disposed in the freezing compartment to the interior of the refrigerating compartment.

The present disclosure provides a refrigerator capable of reducing consumption of electric power upon interruption of electric power.

As apparent from the above description, the refrigerator according to one embodiment of the present disclosure may reduce power consumption upon interruption of electric power in accordance with a configuration including a compressor, a cold storage medium, a power supply to convert AC power supplied from an outside of the refrigerator, and to receive DC power during interruption of electric power, and a controller to perform a control operation to supply a cooling capacity to an interior of the refrigerator by driving the compressor based on the supplied AC power when no interruption of electric power occurs, and to perform a control operation to supply a cooling capacity to the interior of the refrigerator based on the supplied DC power and the cold storage medium during the interruption of electric power.

It may be possible to reduce power consumption based on DC power supplied upon interruption of electric power by supplying a cooling capacity based on the cold storage medium to the interior of the refrigerator for a first period during interruption of electric power, and then driving the compressor based on the supplied DC power for a second period during interruption of electric power, to supply a cooling capacity based on the compressor to the interior of the refrigerator.

The refrigerator according to another embodiment of the present disclosure may reduce power consumption upon interruption of electric power in accordance with a configuration including a compressor, a cold storage medium, a power supply to convert first AC power supplied from an outside of the refrigerator, and to receive second AC power during interruption of electric power, and a controller to perform a control operation to supply a cooling capacity to an interior of the refrigerator by driving the compressor based on the supplied first AC power when no interruption of electric power occurs, and to perform a control operation to supply a cooling capacity to the interior of the refrigerator based on the supplied second AC power and the cold storage medium during the interruption of electric power.

It may be possible to reduce power consumption based on DC power supplied upon interruption of electric power by supplying a cooling capacity based on the cold storage medium to the interior of the refrigerator for a first period during interruption of electric power, and then driving the compressor based on the supplied second AC power for a second period during interruption of electric power, to supply a cooling capacity based on the compressor to the interior of the refrigerator.

In accordance with another aspect of the present disclosure, there is provided an operating method of a refrigerator including a compressor and a cold storage medium, including driving the compressor based on AC power supplied to the refrigerator, thereby supplying a cooling capacity to an interior of the refrigerator, and supplying a cooling capacity to the interior of the refrigerator based on DC power supplied to the refrigerator or stored in the refrigerator and the cold storage medium during the interruption of electric power.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
 a compressor;
 a cold storage medium;
 a power supply for at least one of converting AC power or for receiving DC power during interruption of electric power; and
 a controller to perform a control operation to cool an interior of the refrigerator by driving the compressor based on the supplied AC power when no interruption of electric power occurs, and to perform a control operation to cool the interior of the refrigerator based on the supplied DC power and cold air from the cold storage medium during the interruption of electric power.

2. The refrigerator according to claim 1, wherein, during the interruption of electric power, the controller performs a control operation to cool the interior of the refrigerator based on the cold storage medium for a first period, and then drives the compressor based on the supplied DC power for a second period to cool the interior of the refrigerator based on an operation of the compressor.

3. The refrigerator according to claim 2, further comprising a damper provided between a freezing compartment and a refrigerating compartment in the interior of the refrigerator, wherein the cold storage medium is disposed in the freezing compartment, and the controller performs a control operation to open the damper for at least the first period to supply cold air of the freezing compartment to the refrigerating compartment.

4. The refrigerator according to claim 3, wherein the controller varies at least one of an opening time of the damper and an opening degree of the damper based on a temperature of the refrigerating compartment.

5. The refrigerator according to claim 3, wherein, during the interruption of electric power, the controller performs a control operation to turn off the compressor when a temperature of the refrigerating compartment is equal to or lower than a reference temperature, and performs a control operation to drive the compressor when the temperature of the refrigerating compartment is higher than the reference temperature.

6. The refrigerator according to claim 2, wherein:
 a cooling capacity to cool the interior of the refrigerator upon the interruption of electric power is lower than the cooling capacity to cool the interior of the refrigerator when no interruption of electric power occurs; and
 the cooling capacity for the first period is lower than the cooling capacity for the second period.

7. The refrigerator according to claim 2, further comprising a display to display a cooling capacity supply mode upon the interruption of electric power, wherein the display individually displays the first period and the second period.

8. The refrigerator according to claim 2, further comprising:
 a damper disposed between a freezing compartment and a refrigerating compartment in the interior of the refrigerator,
 wherein the cold storage medium is disposed in the freezing compartment, and the controller performs a control operation to close the damper upon the interruption of electric power to prevent cold air of the cold storage medium from being supplied to the refrigerating compartment for the second period.

9. The refrigerator according to claim 1, wherein the power supply receives the DC power from an external back-up power supply upon the interruption of electric power.

10. The refrigerator according to claim 1, further comprising a battery to store DC power based on the converted AC power, wherein the power supply receives the DC power from the battery upon the interruption of electric power.

11. The refrigerator according to claim 1, further comprising a display to display a cooling capacity supply mode upon the interruption of electric power.

12. The refrigerator according to claim 1, further comprising:
 an AC power sensor to sense the externally supplied AC power supplied from the outside; and
 a DC power sensor to sense the DC power supplied upon the interruption of electric power,
 wherein the controller determines whether or not interruption of electric power has occurred based on at least one of the AC power sensed by the AC power sensor or the DC power sensed by the DC power sensor.

13. The refrigerator according to claim 1, further comprising a communication module,
 wherein the controller varies an operation mode of the refrigerator or an operation time of the refrigerator during the interruption of electric power based on at least one of information about interruption of electric power, a kind of the DC power supplied upon the interruption of electric power, a level of the DC power, or a supply duration of the DC power received from the communication module.

14. An operating method of a refrigerator including a compressor and a cold storage medium, comprising:
 driving the compressor based on AC power received by the refrigerator to cool an interior of the refrigerator; and
 cooling the interior of the refrigerator based on DC power and cold air of the cold storage medium during the interruption of electric power.

15. The operating method according to claim 14, wherein cooling during the interruption of electric power comprises:
 supplying cold air of the cold storage medium to the interior of the refrigerator for a first period; and
 driving the compressor based on the DC power for a second period to cool the interior of the refrigerator.

16. The operating method according to claim 15, wherein cooling during the interruption of electric power comprises:
 opening a damper provided between the refrigerating compartment and a freezing compartment serving as the cold storage medium, for the first period, to supply cold air of the freezing compartment to the refrigerating compartment; and closing the damper for the second period to prevent cooling of the refrigerating compartment by the cold air of the freezing compartment.

17. The operating method according to claim 14, wherein cooling during the interruption of electric power comprises:
turning off the compressor when a temperature of a refrigerating compartment is equal to or lower than a reference temperature; and
driving the compressor when the temperature of the refrigerating compartment is higher than the reference temperature.

\* \* \* \* \*